US008958422B2

(12) United States Patent
Celik et al.

(10) Patent No.: US 8,958,422 B2
(45) Date of Patent: Feb. 17, 2015

(54) HANDLING PACKET DATA CONVERGENCE PROTOCOL DATA UNITS

(75) Inventors: Zahide Ozlem Celik, Reading (GB); Mahmet Bilgin, Reading (GB)

(73) Assignee: BlackBerry Limited, Waterloo, Ontario (CA)

( * ) Notice: Subject to any disclaimer, the term of this patent is extended or adjusted under 35 U.S.C. 154(b) by 286 days.

(21) Appl. No.: 13/423,210

(22) Filed: Mar. 17, 2012

(65) Prior Publication Data

US 2013/0242859 A1    Sep. 19, 2013

(51) Int. Cl.
*H04L 12/26* (2006.01)

(52) U.S. Cl.
USPC .......................................................... 370/389

(58) Field of Classification Search
USPC .................. 370/216, 229, 328, 350, 389, 394
See application file for complete search history.

(56) References Cited

U.S. PATENT DOCUMENTS

| 8,054,836 | B2* | 11/2011 | Fischer ........................ 370/394 |
| 2007/0041382 | A1* | 2/2007 | Vayanos et al. ............... 370/394 |
| 2010/0034169 | A1 | 2/2010 | Maheshwari et al. |
| 2011/0286416 | A1* | 11/2011 | Wang et al. .................... 370/329 |

FOREIGN PATENT DOCUMENTS

| WO | 2009009532 | 1/2009 | |
| WO | 2009045945 | 4/2009 | |
| WO | 2009070576 | 6/2009 | |
| WO | WO2012060565 A2 * | 5/2012 | ............ H04W 76/02 |

OTHER PUBLICATIONS

3GPP TS 36.323 V10.1.0 (Mar. 2011), 3rd Generation Partnership Project, Technical Specification Group Radio Access Network, Evolved Universal Terrestrial Radio Access (E-UTRA), Packet Data Convergence Protocol (PDCP) Specification (Release 10), 26 pages.
Jonsson et al., "The Robust Header Compression (ROHC) Framework," Network Working Group, RFC 4995, Jul. 2007, 44 pages.
International Search Report and Written Opinion for PCT Application No. PCT/GB2013/050642, mailed on Jun. 13, 2013, 10 pages.
European Search Report issued in EP application No. 12185289.1 on Jun. 12, 2013, 8 pages.
International Preliminary Report on Patentability under Chapter I issued in International Application No. PCt/GB2013/050642 on Oct. 2, 2014; 7 pages.

* cited by examiner

*Primary Examiner* — Curtis A Alia
(74) *Attorney, Agent, or Firm* — Fish & Richardson P.C.

(57) ABSTRACT

Systems, apparatus and methods can be implemented for handling packet data convergence protocol (PDCP) protocol data units (PDUs). A described technique includes receiving a packet data convergence protocol (PDCP) protocol data unit (PDU). It can be determined whether the received PDCP PDU is a duplicate PDCP PDU or that the received PDCP PDU is outside of a reordering window. The received PDCP PDU can be discarded without performing deciphering or header decompression for the received PDCP PDU.

31 Claims, 6 Drawing Sheets

For DRBs mapped on RLC AM, at reception of a PDCP Data PDU from lower layers, the UE shall:
- if received PDCP SN – Last_Submitted_PDCP_RX_SN > Reordering_Window or 0 <= Last_Submitted_PDCP_RX_SN – received PDCP SN < Reordering_Window:
  - if header compression is configured:
    - if received PDCP SN > Next_PDCP_RX_SN:
      - decipher the PDCP PDU as specified in the subclause 5.6, using COUNT based on RX_HFN - 1 and the received PDCP SN; *(510)*
    - else:
      - decipher the PDCP PDU as specified in the subclause 5.6, using COUNT based on RX_HFN and the received PDCP SN;
    - perform header decompression ~~(if configured)~~ as specified in the subclause 5.5.5; *(515)*
  - discard this PDCP SDU;
- else if Next_PDCP_RX_SN – received PDCP SN > Reordering_Window:
  - increment RX_HFN by one;
  - use COUNT based on RX_HFN and the received PDCP SN for deciphering the PDCP PDU;
  - set Next_PDCP_RX_SN to the received PDCP SN + 1;
- else if received PDCP SN – Next_PDCP_RX_SN >= Reordering_Window:
  - use COUNT based on RX_HFN – 1 and the received PDCP SN for deciphering the PDCP PDU;
- else if received PDCP SN >= Next_PDCP_RX_SN:
  - use COUNT based on RX_HFN and the received PDCP SN for deciphering the PDCP PDU;
  - set Next_PDCP_RX_SN to the received PDCP SN + 1;
  - if Next_PDCP_RX_SN is larger than Maximum_PDCP_SN:
    - set Next_PDCP_RX_SN to 0;
    - increment RX_HFN by one;
- else if received PDCP SN < Next_PDCP_RX_SN:
  - use COUNT based on RX_HFN and the received PDCP SN for deciphering the PDCP PDU;
- if the PDCP PDU has not been discarded in the above:
  - ~~perform deciphering and header decompression (if configured) for the PDCP PDU as specified in the subclauses 5.6 and 5.5.5, respectively;~~
  - if a PDCP SDU with the same PDCP SN is stored: *(520)*
    - if header compression is configured:
      - perform deciphering and header decompression for the PDCP PDU as specified in the subclauses 5.6 and 5.5.5, respectively; *(530)*
    - discard this PDCP SDU; *(540)*
  - else:
    - perform deciphering and header decompression (if configured) for the PDCP PDU as specified in the subclauses 5.6 and 5.5.5, respectively;
    - store the PDCP SDU; *(550)*
  - if the PDCP PDU received by PDCP is not due to the re-establishment of lower layers:
    - deliver to upper layers in ascending order of the associated COUNT value:

FIG. 5

HANDLING PACKET DATA CONVERGENCE PROTOCOL DATA UNITS

TECHNICAL FIELD

This disclosure relates to wireless communications and, more particularly, to handling Packet Data Convergence Protocol (PDCP) Protocol Data Units (PDUs).

BACKGROUND

Communication networks include wired and wireless networks. Example wired networks include the Public Switched Telephone Network (PSTN) and the Ethernet. Example wireless networks include cellular networks as well as unlicensed wireless networks that connect to wired networks. Calls and other communication sessions may be connected across both wired and wireless networks.

Long Term Evolution (LTE) is a wireless communications standard that is promulgated by the 3rd Generation Partnership Project (3GPP) as a major fourth generation (4G) communications standard. Evolved Universal Terrestrial Radio Access Network (E-UTRAN) is the air interface of 3GPP's LTE upgrade path for wireless networks. The E-UTRAN protocol stack has multiple layers including PDCP, Radio Link Control (RLC), Medium Access Control (MAC), and physical layer (PHY). The PDCP layer provides transport for user payload, such as Internet Protocol (IP) packets in the user plane and/or control plane data in the control plane, depending on the radio bearer for which it is carrying data. In operation, the PDCP layer may receive PDU from lower layers. The received PDU is a Service Data Unit (SDU) that can be delivered to upper layers.

DESCRIPTION OF DRAWINGS

FIG. 5 is a schematic showing a 3GPP standard amendment proposal.

Like reference symbols in the various drawings indicate like elements.

DETAILED DESCRIPTION

Figure 1:
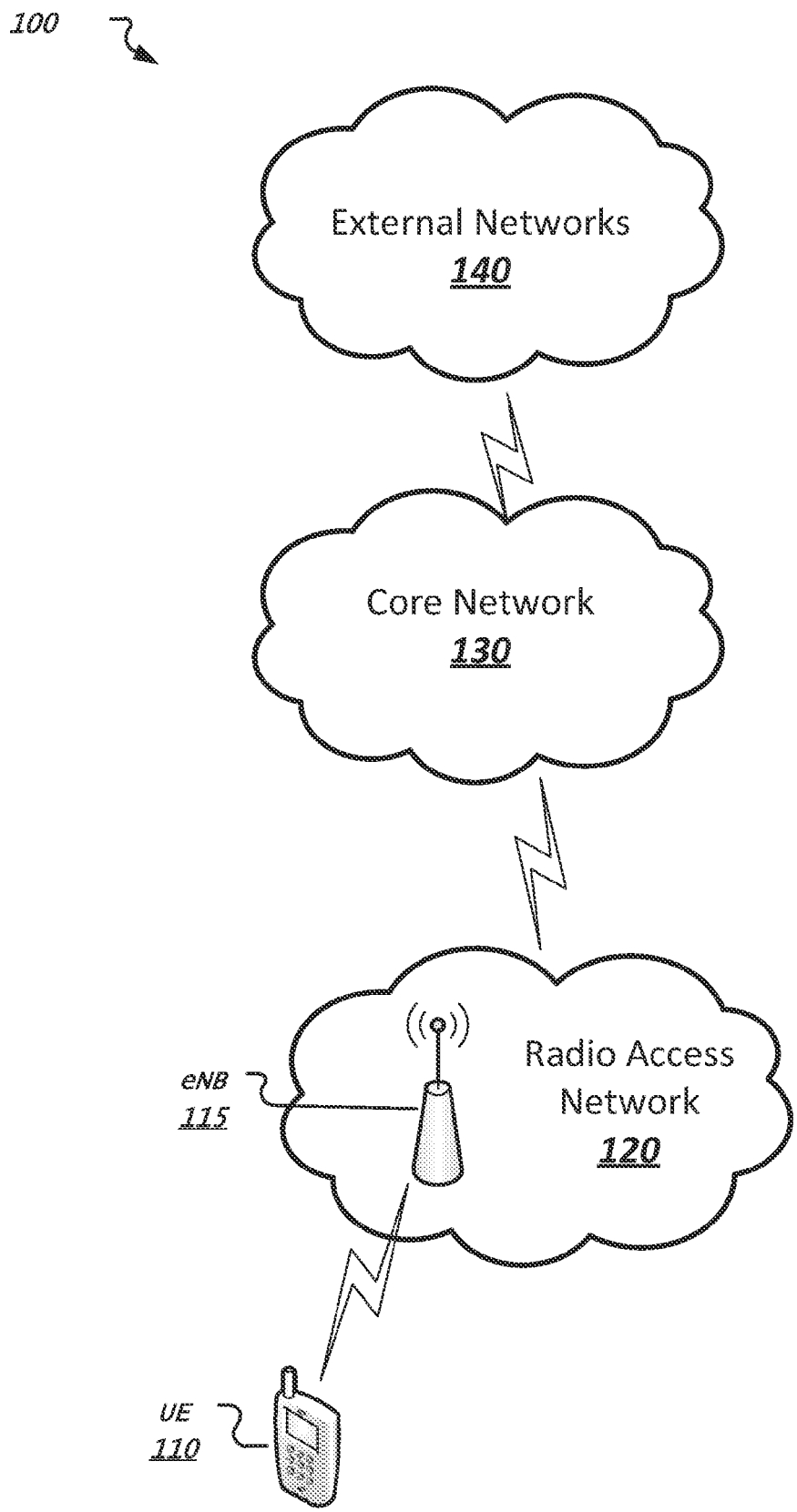
FIG. 1 is a schematic representation of an example wireless cellular communications system.

The present disclosure is directed to systems, apparatuses, and methods that handle Packet Data Convergence Protocol (PDCP) Protocol Data Units (PDUs). PDCP is one of the layers of a radio protocol stack. The PDCP can perform header compression, decompression, ciphering, deciphering, transfer of user data, and/or the maintenance of sequence numbers for Data Radio Bearers (DRBs). PDCP PDU is a unit of data that can be specified in PDCP. Generally, a PDCP PDU may be a PDCP data PDU or a PDCP control PDU. PDCP data PDU may be used to communicate information including PDCP sequence number (SN), user plane data or control plane data. PDCP control PDU may be used to communicate information including PDCP status report and header compression control information. In the present disclosure, "PDCP data PDU" may sometimes be referred to as "PDCP PDU" for simplicity, and is distinctive from "PDCP control PDU". A PDCP entity of a wireless communication device can communicate PDCP PDUs to a peer PDCP entity of another wireless communication device. The PDCP entity may be located in the PDCP layer. Each PDCP entity is associated with a radio bearer (e.g., a DRB, or a Signaling Radio Bearer (SRB) except for SRB0). The PDCP entity may be associated with a control plane or a user plane, depending on the radio bearer for which the PDCP entity carries data.

In the PDCP entity transmission process, a wireless communication device performs a sequence numbering operation on the data packets, where a Sequence Number (SN) is included in an SN field of a PDCP header for each PDCP data PDU. Each PDCP entity that carries user plane data can use header compression per radio bearer configured by upper layers to compress the header information included in PDCP SDU (e.g., TCP/IP header). After security activation (by upper layers), the PDCP entity also performs ciphering after performing header compression.

In certain aspects of the PDCP entity receiving process, the PDCP entity can identify the SN from the SN field of the header of the received PDCP PDU. The PDCP entity can use the identified SN to perform a reordering and duplication detection. For reordering, the PDCP entity may determine whether the identified SN of the received PDCP PDU is outside of a reordering window. For example, the PDCP entity may determine whether the SN of the received PDCP PDU exceeds a previously received PDCP PDU by a particular value. If yes, the received PDCP PDU may be discarded. For duplication detection, the PDCP entity may determine whether the identified SN of the received PDCP PDU equals a stored SN of a previously received PDCP PDU. If yes, the received PDCP PDU may be discarded. The PDCP entity may also determine whether header compression is configured by upper layers. If yes, the PDCP entity may perform deciphering and header decompression for the received PDCP PDU. Otherwise, the PDCP entity may discard the received PDCP PDU without performing deciphering and header decompression.

Therefore, according to some of the various aspects of the present disclosure, a received PDCP PDU may be discarded without performing deciphering and header decompression. As such, unnecessary deciphering operations on the received PDCP PDUs may be avoided and processing resources may be saved. Other features and implementations of the present disclosure will be apparent from the following description and the claims.

Various aspects of the disclosure include systems, apparatuses, and methods for discarding PDCP PDU without performing deciphering and/or header compression. In certain aspects, a packet data convergence protocol (PDCP) protocol data unit (PDU) can be received. It can be determined that the received PDCP PDU is a duplicate PDCP PDU or that the received PDCP PDU is outside of a reordering window. The received PDCP PDU can be discarded without performing deciphering or header decompression for the received PDCP PDU. In some aspects, the PDCP PDU is received at a PDCP layer from a lower layer. In some aspects, a received PDCP sequence number (SN) of the received PDCP PDU can be identified. A Last SN of a last PDCP service data unit (SDU) delivered to an upper layer can be identified. The Last SN identifying the SN associated with the last PDCP SDU (e.g., the most recently received PDCP SDU prior to receiving the PDCP PDU). In some aspects, it can be determined that the received PDCP PDU is a duplicate PDU is based on determining that the received PDCP SN is the same as a stored PDCP SN.

In some aspects, it can be determined that the received PDCP PDU is outside of the reordering window is based on determining that the received PDCP SN minus the Last SN is greater than a reordering window size or that both the Last SN minus the received PDCP SN is greater than or equal to zero and less than the reordering window.

In some aspects, discarding the received PDCP PDU without performing deciphering or header decompression for the received PDCP PDU may be responsive to determining that header compression is not configured. In some aspects, the received PDCP PDU may be associated with a data radio bearer that maps to a radio link control acknowledge mode. The received PDCP SN may be identified based on a header of the received PDCP PDU, and the Last SN of the last PDCP SDU delivered is identified based on a header of the last PDCP SDU delivered.

In some aspects, the last PDCP SDU delivered to the upper layer is an adjacent PDCP PDU received from the lower layer prior to the received PDCP PDU. In some aspects, the last PDCP SDU delivered to the upper layer corresponds to a 'Last_Submitted_PDCP_RX_SN' PDCP state variable, and the reordering window size corresponds to a 'Reordering_Window' PDCP constant. The 'Last_Submitted_PDCP_RX_SN' may be set to 4095 at an establishment of the PDCP entity, and the 'Reordering_Window' may be set to 2048.

Other aspects are consistent with this disclosure and are apparent from the disclosure and the claims.

FIG. 1 is a schematic representation of an example wireless cellular communications system 100. The wireless cellular system 100 illustrated in FIG. 1 may be a 3GPP LTE system, also known as Evolved Universal Terrestrial Radio Access (E-UTRA) system or LTE Advanced system. The LTE wireless cellular system 100 includes one or more UEs (one UE 110 is shown), a radio access network (RAN) 120, a core network (CN) 130, (e.g., evolved packet core (EPC)), and external networks 140 (e.g., IP networks). The RAN 120 further includes one or more base stations (one base station 115 is shown). The base station 115 may be an evolved Node B (eNB).

The UE 110 may be any mobile electronic device that is suitable to perform one or more PDCP PDU handling processes described in the disclosure. Generally, the UE 110 may be used by an end-user to communicate, for example, within the wireless cellular communications system 100. The UE 110 may be referred to as mobile electronic device, mobile device, user device, mobile station, subscriber station, or wireless terminal. UE 110 may be a cellular phone, personal data assistant (PDA), smartphone, laptop, tablet personal computer (PC), or other wireless communication device. Further, UEs 110 may include pagers, portable computers, Session Initiation Protocol (SIP) phones, one or more processors within devices, or any other suitable processing devices capable of communicating information using a radio technology. UE 110 may communicate directly with a base station 115 included in a RAN 120 to receive service when UE 110 is operated within the cell associated with the corresponding base station 115. UE 110 may also receive radio signals from more than one base station 115 included in RAN 120.

In some implementations, UEs 110 may transmit in one or more cellular bands. One or more UEs 110 may be communicably coupled to the RAN 120. In these cases, messages transmitted or received by UEs 110 may be based on one or more multiple radio access technologies. In some implementations, the UEs 110 may be configured to use, for example, orthogonal frequency division multiple access (OFDMA) technology or single carrier—frequency division multiple access (SC-FDMA) technology, to communicate with a base station 115. UEs 110 may transmit voice, video, multimedia, text, web content or any other user/client-specific content. In short, UEs 110 generate requests, responses or otherwise communicate in different means with core network 130 or external networks 140 through RAN 120.

Functionally, the UE 110 may be used as a platform for different applications of communications. For example, the UE 110 may be used for interacting with the cellular network by transmitting/receiving signals for initiating, maintaining or terminating the communications the end-user requests. The UE 110 may also include mobility management functions such as performing handovers and reporting a location of the UE 110. The UE 110 performs these mobility management functions based on instructions provided by the cellular network. One exemplary function of the UE 110 may be to provide the user interface to the end-user so that applications such as voice call, data transmission or web browsing may be implemented.

The UE 110 can include a user plane protocol stack that has multiple layers for characterizing or standardizing the functions of wireless communications between the UE 110 and an eNB 115. The layer may include a Packet Data Convergence Protocol (PDCP) layer, Radio Link Control (RLC) layer, Medium Access Control (MAC) layer, and Physical (PHY) layer. In PDCP downlink data transfer procedures for DRBs mapped on RLC acknowledge mode (AM), the UE 110 may perform a reordering or duplication detection to discard some of the received PDCP PDUs from the eNB 115. The UE 110 performs the reordering based on determining whether the received PDCP PDU is outside of a reordering window. For example, a received PDCP PDU is outside of a reordering window when the SN of the received PDCP PDU exceeds an SN of a last PDCP SDU delivered to an upper layer by a particular value (e.g., a reordering window size). The UE 110 performs duplication detection based on determining whether the received PDCP PDU is a duplicate PDCP PDU. For example, a received PDCP PDU is a duplicate PDU when the SN of the received PDCP PDU is the same as a previously stored PDCP SN. When header compression is not configured by upper layers, the UE 110 may discard the received PDCP PDU without performing deciphering and header decompression if the UE 110 determines that the received PDCP PDU is outside of a reordering window or that the received PDCP PDU is a duplicated PDCP PDU.

In various implementations, a RAN 120 in a 3GPP LTE system may be an Evolved Universal Terrestrial Radio Access Network (E-UTRAN). The RAN 120 can be located between the UEs 110 and the CN 130. The RAN 120 includes one or more base stations 115. The base stations 115 may be radio base stations 115 that control one or more radio-related functions. The base station 115 may directly communicate with one or more UEs 110, other base stations 115 or the CN 130. The base station 115 may be the end point of the radio protocols towards the UEs 110 and may relay signals between the UEs 110 and the CN 130. As described above, an enhanced base station in LTE can be referred to as an eNB. An eNB can provide an LTE air interface service and perform radio resource management for E-UTRAN. An eNB may also perform functions performed by other radio network elements in legacy systems (e.g., 2G/3G cellular systems such as Global System for Mobile Communications (GSM) and Universal Mobile Telecommunications System (UMTS) networks). For example, at least a portion of functions of a radio network controller (RNC) may be incorporated in an eNB. Other eNB functionalities may include radio protocol management, mobility management, and packet retransmission and header compression. The eNB 115 can include a user plane protocol stack that has multiple layers. Example layers can include a PDCP layer, a RLC layer, a MAC layer, and a PHY layer.

Figure 2:
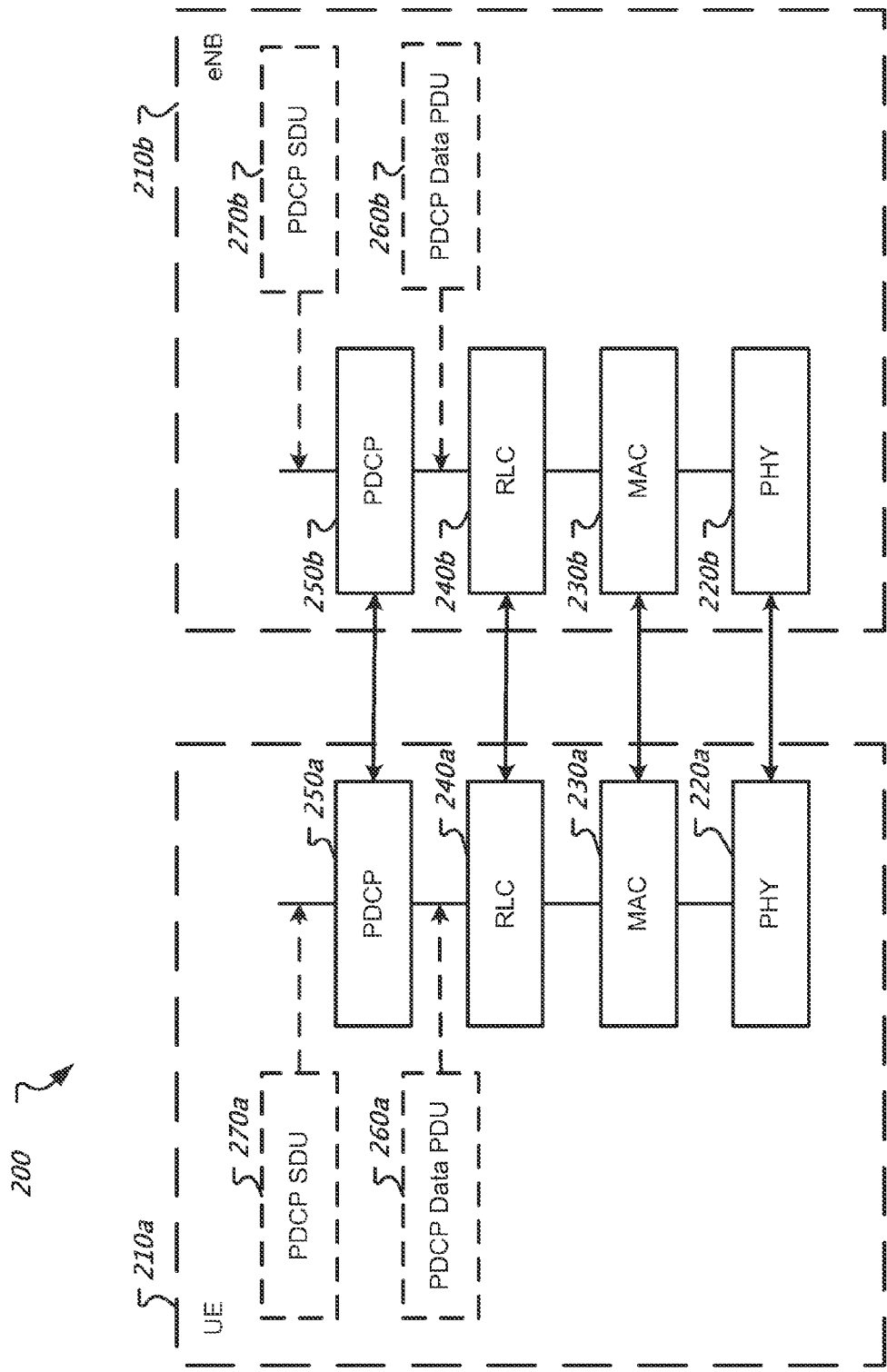
FIG. 2 is a schematic illustrating user plane protocol stacks for a UE and an evolved NodeB (eNB).

FIG. 2 is a schematic 200 illustrating user plane protocol stacks for a UE 210*a* and an eNB 210*b*. In other words, the illustrated schematic 200 includes UE side protocol stack 210*a* and eNB side protocol stack 210*b*. While the schematic 200 is illustrated as including a UE and an eNB, the schematic 200 can include any wireless communication devices, such as the wireless communication devices 605, 607 described with regard to FIG. 6, without departing from the scope of this disclosure. User plane protocol stack 210*a* and 210*b* can include multiple abstraction layers for characterizing or standardizing the functions of wireless communications between the UE and eNB. The illustrated layers of the UE side protocol stack 210*a* include, from top to bottom, PDCP 250*a*, RLC 240*a*, MAC 230*a*, and PHY 220*a*. The illustrated layers of the eNB side protocol stack 210*b* include, from top to bottom, PDCP 250*b*, RLC 240*b*, MAC 230*b*, and PHY 220*b*. The UE side protocol stack 210*a* and the eNB side protocol stack 210*b* may include other layers for providing various functions in wireless communications.

PDCPs 250*a* and 250*b* can receive respective PDCP data PDUs 260*a* and 260*b* directly from associated RLC layers 240*a* and 240*b*; and send respective PDCP data SDUs 270*a* and 270*b* to a respective upper layer. A UE entity can interact with a corresponding entity at the same layer in the eNB by means of a protocol by transmitting a PDU. For example, the PDCP 250*a* entity may interact with the corresponding PDCP 250*b* entity by transmitting PDCP data PDU.

Generally, a PDU is a protocol data unit that is specified in a protocol of a given layer. The PDU may include protocol-control information and/or user data of the given layer. For example, the PDCP data PDU 260*a* and 260*b* is a PDU of PDCP layer 250*a* and 250*b*, respectively. The PDCP SDU 270*a* and 270*b* can be the "payload" of the PDCP data PDU. As illustrated in FIG. 2, PDCP SDU 270*a* and PDCP data PDU 260*a* are the data units associated with the PDCP 250*a* of the UE, and the PDCP SDU 270*b*, respectively and PDCP data PDU 260*b* are the data units associated with the PDCP 250*b* of the eNB. The process of changing the PDCP SDU 270*a* and 270*b* to the PDCP data PDU 260*a* and 260*b* can include an encapsulation process performed by the PDCP. Correspondingly, the process of changing the PDCP data PDU 260*a* and 260*b* to the PDCP SDU 270*a* and 270*b* can include decoding the PDCP data PDU to extract the PDCP SDU 270*a* and 270*b* (e.g., deciphering, header decompression).

Generally, PDCP 250*a* and 250*b* delivers data packets to and receives data packets from a peer PDCP entity. Each PDCP entity can be associated with a DRB. Depending on characteristics of the traffic, the DRB may be mapped to an RLC 240*a* and 240*b* acknowledged mode (AM), or an RLC 240*a* and 240 unacknowledged mode (UM). For example, Transmission Control Protocol (TCP)/Internet Protocol (IP) traffic can be mapped to RLC AM since reliable radio transport is required for TCP/IP. In some cases, PDCP entities associated with the DRBs can be configured by upper layers to use header compression. In data packet transmission, header compression for user plane data may be performed by a PDCP entity using a header compression protocol. The header compression protocol can generate two types of output packets: 1) compressed packets, each associated with one PDCP SDU; and 2) standalone packets not associated with a PDCP SDU. The compressed packets associated with PDCP SDU may then be ciphered, added to the PDCP header, and transmitted to the peer PDCP entity as PDCP data PDU. In data packet reception, the peer PDCP entity may remove the PDCP header from the received PDCP data PDU, decipher the compressed packets, and perform a header decompression of the compressed packets.

In some implementations, header compression may not be configured. For example, in large volume data transfers, header compression my not be configured since the TCP/IP header size may be negligible compared to the size of PDCP data PDU. In such cases, and for the DRBs mapped on RLC AM, when PDCP downlink PDU received from lower layers is outside of a reordering window or the PDCP PDU is a duplicated PDCP PDU, the PDCP entity may discard the PDU without deciphering, in order to save processing resources. Since header compression is not configured, the header is discarded without performing header decompression. Determining a received PDCP PDU is outside of a reordering window or the PDCP PDU is a duplicated PDU is described with more detail with regard to FIG. 3.

Figure 3:
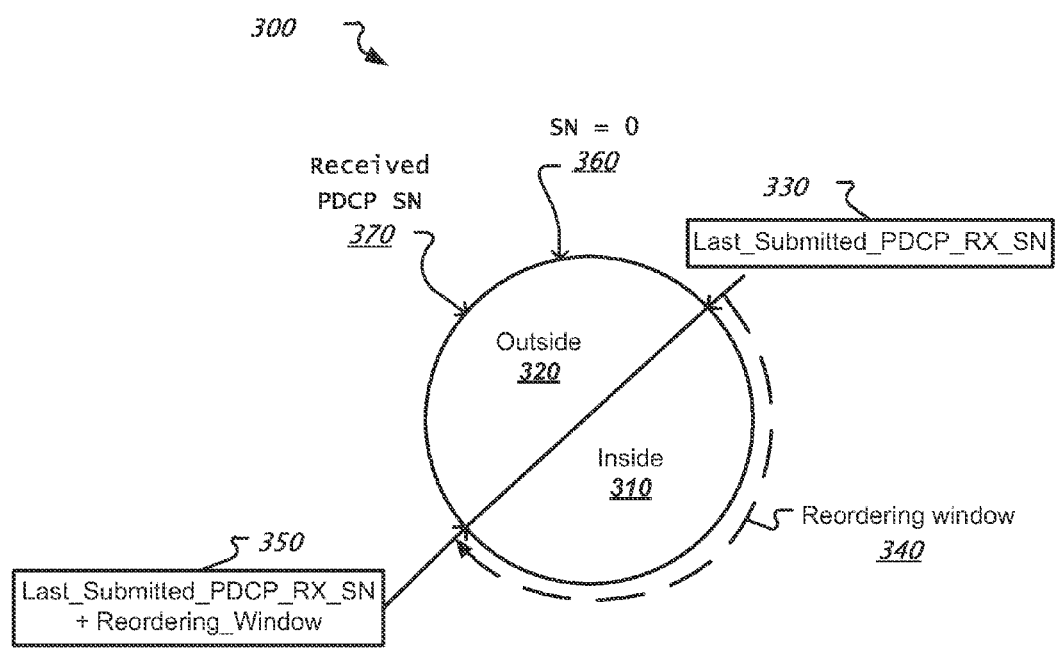
FIG. 3 is a schematic showing an example of a reordering window and an associated state variable for managing PDCP downlink data transfer procedures.

FIG. 3 is a schematic showing an example 300 of a reordering window and an associated state variable for managing PDCP downlink data transfer procedures. PDCP downlink data transfer procedures are managed by using state variables. For example, a UE can use state variables 'Last_Submitted_PDCP_RX_SN' 330 and 'Reordering_Window' in a PDCP downlink data transfer procedure to perform reordering.

In some cases, A UE may receive out-of-sequence or duplicated PDCP PDUs due to handover associated data forwarding from a source base station to a target base station. The UE may perform reordering in order to cope with PDCP PDUs outside of a reordering window, and may perform duplication detection to identify duplicated reception of PDCP PDUs. More specifically, reordering and duplication detection may be performed by a receiving PDCP entity for the DRB mapped onto RLC AM of the UE.

For reordering, the UE may identify an SN of the received PDCP PDU, i.e., a received PDCP SN. The UE may then determine whether the received PDCP SN is outside of a reordering window 340. If yes, the PDCP PDU is discarded because the reordering window 340 has already been moved forward when some PDCP SDUs received in sequence were forwarded to the upper layers. The UE may also determine whether a header compression is configured. If yes, the UE performs deciphering and header decompression for the PDCP PDU prior to it being discarded. Otherwise, the UE may discard the PDCP PDU without performing deciphering In the approach illustrated in FIG. 3, the reordering window is determined based on the state variables 'Last_Submitted_PDCP_RX_SN' 330 and 'Reordering_Window'. The variable 'Last_Submitted_PDCP_RX_SN' 330 may indicate an SN of the last PDCP SDU delivered to the upper layer of the PDCP layer. The SN may be included in the header of a PDCP PDU and transmitted without being ciphered. In some cases, the UE may set Last_Submitted_PDCP_RX_SN 330 to 4095 at the establishment of the PDCP entity. The SN is a number that can identify a PDCP PDU. In some instances, the SN can have a size of 12 bits for DRBs that are mapped to RLC AM. The value of 'Reordering_Window' can indicate the size of the reordering window 340. In some cases, 'Reordering Window' is set to 2048 for DBRs that are mapped to RLC AM.

A received PDCP SN is outside 320 of the reordering window 340 when received PDCP SN−Last_Submitted_PDCP_RX_SN>Reordering_Window, or 0≤Last_Submitted_PDCP_RX_SN−received PDCP SN<Reordering_Window. For example, let point 360 of the circle shown in FIG. 3 corresponds to SN=0 and the SN increases clockwise along the circle. Let point 330 corresponds to the value of Last_Submitted_PDCP_RX_SN, point 350 corresponds to the value of Last_Submitted_PDCP_RX_SN+Reordering_Window, and point 370 corresponds to the value of a received PDCP SN. The received PDCP SN is shown to be outside 320 of the reordering window 340 when received PDCP SN—Last_Submitted_PDCP_RX_SN>Reordering_Window or 0≤Last_Submitted_PDCP_RX_SN–received PDCP SN<Reordering_Window.

Based on determining a received PDCP SN is outside 320 or the reordering window 340, a UE may discard the received PDCP PDU. When the UE further determines that a header compression is not configured by upper layers, the UE may not decipher the discarded received PDCP PDU. Otherwise, the UE may decipher and perform header decompression of the received PDCP PDU.

For duplication detection, the UE determines whether the SN of a received PDCP PDU matches an SN of a PDCP PDU that has already been stored. If yes, the received PDCP PDU may be discarded. The UE may also determine whether a header compression is configured by upper layers. If yes, the UE performs deciphering and header decompression for the received PDCP PDU. Otherwise the received PDCP PDU is discarded without performing deciphering.

Figure 4:
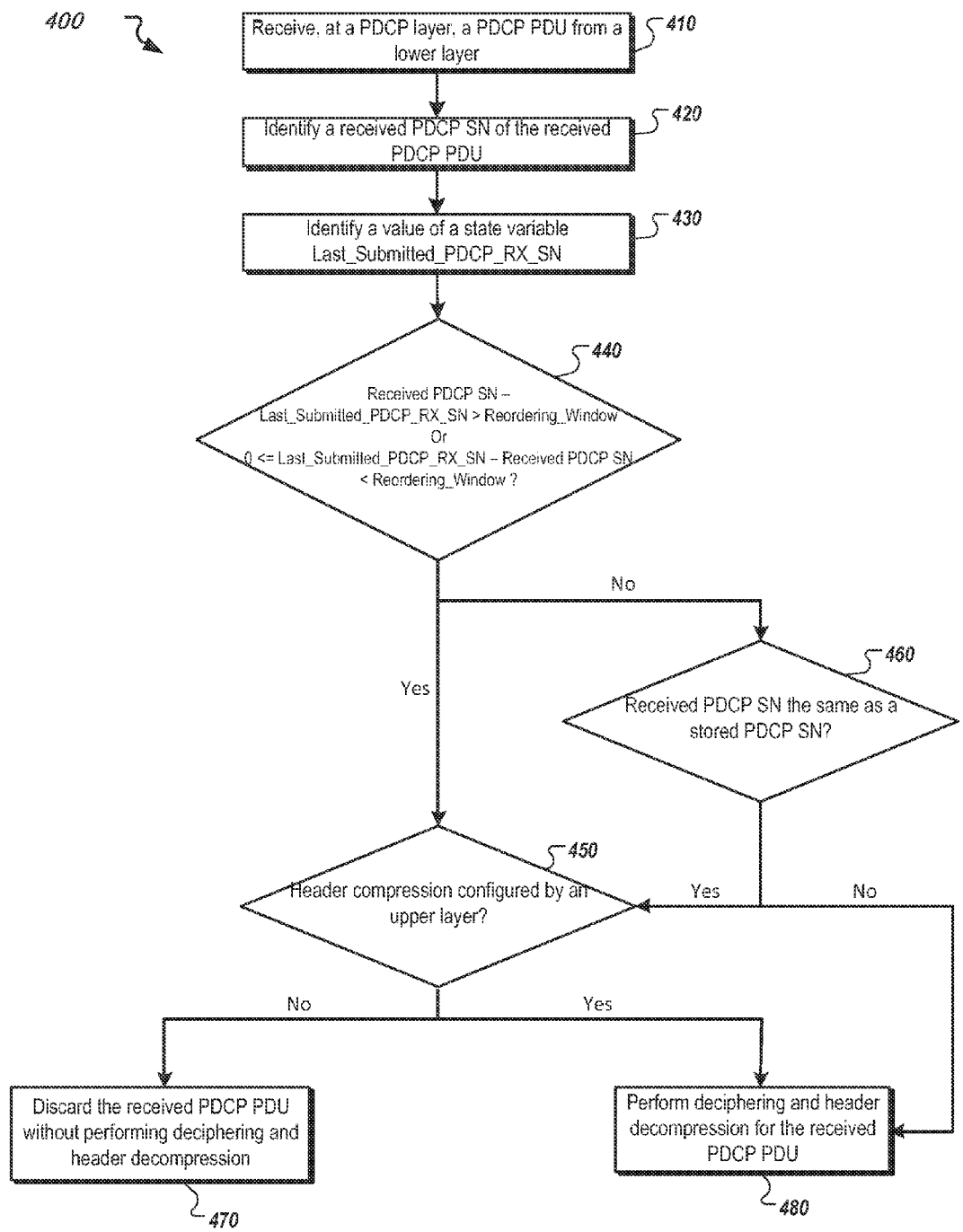
FIG. 4 is a flowchart showing an example process of handling PDCP PDU.

FIG. 4 is a flowchart showing an example process 400 of handling PDCP PDU. The example process 400 may be performed by a wireless communication device such as the wireless communication device 605 or 607 described with regard to FIG. 6. In some implementations, the example process 400 may be performed according to a PDCP downlink data transfer procedure for DRBs mapped on RLC AM. At step 410, the wireless communication device receives, at a PDCP layer, a PDCP PDU from a lower layer. The lower layer can be an RLC layer, and the PDCP PDU can be decoded to extract a PDCP SDU to be delivered to an upper layer of the PDCP layer.

At step 420, the wireless communication device identifies a received PDCP SN of the received PDCP PDU. The SN may identify a PDCP PDU and may be included in the header of the PDCP PDU. In many cases, the SN may be transmitted with the associated PDCP PDU without being ciphered. Therefore, the received PDCP SN may be identified by parsing the header of the received PDCP PDU, which may in turn, be included as the first one or two bytes of the received PDCP PDU.

At step 430, the wireless communication device identifies a value of the state variable Last_Submitted_PDCP_RX_SN. The state variable Last_Submitted_PDCP_RX_SN may indicate the SN of the last PDCP SDU delivered to the upper layer of the PDCP layer.

At step 440, the wireless communication device determines whether the received PDCP SN minus the SN of the last PDCP SDU delivered to the upper layer is greater than a predetermined reordering window (i.e., received PDCP SN—Last_Submitted_PDCP_RX_SN>Reordering_Window), or the SN of the last PDCP SDU delivered to the upper layer minus the received PDCP SN is greater than or equal to zero and less than the predetermined reordering window (i.e., 0≤Last_Submitted_PDCP_RX_SN–received PDCP SN<Reordering_Window). The operation at 450 can be a check if a received PDCP PDU is outside of a reordering window, performed by the wireless communication device, as described with respect to FIG. 3. The determination is based on whether the received PDCP SN is outside of a reordering window indicated by the values of 'Reordering_Window' and 'Last_Submitted_PDCP_RX_SN'. If yes, the example process 400 proceeds to step 450.

At step 450, the wireless communication device determines whether header compression is configured by an upper layer. If yes, the example process 400 proceeds to step 480, in which the wireless communications device may decipher the received PDCP PDU. After deciphering, the wireless communication device performs a header decompression (if configured) to the received PDCP PDU. Otherwise, the example process proceeds to step 470, in which the wireless communications device discards the received PDCP PDU without performing deciphering and header decompression for the received PDCP PDU.

If the wireless communications device determines that the received PDCP SN is not outside of the reordering window at step 440, the example process proceeds to step 460. At step 460, the wireless communication device determines whether the received PDCP SN is the same as a stored PDCP SN. The operation at 460 can be a duplication detection performed by the wireless communication device. If the received PDCP SN is not the same as any stored PDCP SN, the example process 400 proceeds to 480, where the wireless communication device deciphers the received PDCP PDU, and then performs header decompression (if configured) for the received PDCP PDU. Otherwise, the example process 400 proceeds to 450, in which the wireless communication device determines whether the header compression is configured by the upper layer. If yes, the example process 400 proceeds to step 480, in which the wireless communications device may decipher the received PDCP PDU and perform a header decompression to the received PDCP PDU. Otherwise, the example process proceeds to step 470, in which the wireless communications device discards the received PDCP PDU without performing deciphering and header decompression for the received PDCP PDU.

FIG. 5 is a schematic showing a 3GPP standard amendment proposal 500. In the amendment proposal 500, the clause "if header compression is configured" 510 is added. Based on this addition, it can become apparent that if received PDCP SN–Last_Submitted_PDCP_RX_SN>Reordering_Window or 0<=Last_Submitted_PDCP_RX_SN–received PDCP SN<Reordering_Window, and header compression has not been configured by an upper layer, the corresponding PDCP SDU (extracted from the received PDCP PDU) is discarded without being deciphered. Accordingly, the clause "(if configured)" 515 is removed based on the newly added clause 510, since the UE performs the header decompression under the condition "if header compression is configured" 510.

The clause "perform deciphering and header decompression (if configured) for the PDCP PDU as specified in the subclauses 5.6 and 5.5.5, respectively" 520 is removed such that deciphering and header decompression will not be performed by the UE by default. The clauses "if header compression is configured" 530 and "perform deciphering and header decompression for the PDCP PDU as specified in the subclauses 5.6 and 5.5.5, respectively" 540 are added to under the existing clause "if a PDCP SDU with the same PDCP SN is stored," to illustrate that deciphering and header decompression for the PDCP PDU are performed by the UE if header compression is configured. On the other hand, if the header compression is absent from being configured by an upper layer, the corresponding PDCP SDU is discarded.

The clause "perform deciphering and header decompression (if configured) for the PDCP PDU as specified in the subclauses 5.6 and 5.5.5, respectively" 550 is added to illustrate that deciphering and header decompression for the PDCP PDU is performed when the PDCP PDU has not been discarded in the previous operations, there is no PDCP SDU stored with the same PDCP SN as the received PDCP PDU, and header compression is configured.

Figure 6:
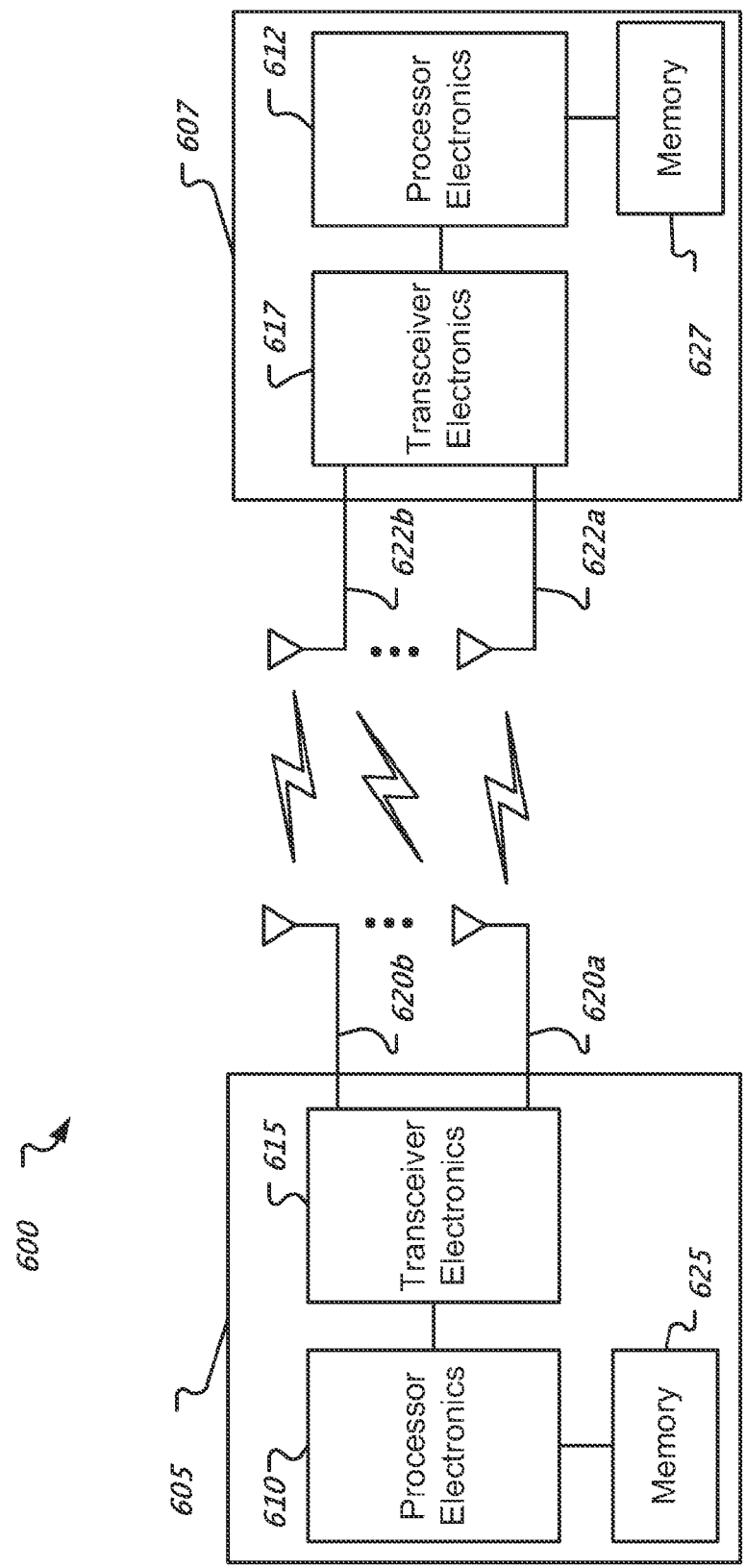
FIG. 6 is a schematic showing an example of a wireless network with two wireless communication devices.

FIG. 6 is a schematic showing an example of a wireless network 600 with two wireless communication devices. Wireless communication devices 605, 607, such as an access device, base station, NodeB, eNB, wireless headset, access terminal, client station, or mobile station, can include circuitry such as processor electronics 610, 612. Processor electronics 610, 612 can include one or more processors that implement one or more techniques presented in this disclosure. Wireless communication devices 605, 607 include circuitry such as transceiver electronics 615, 617 to send and receive wireless signals over one or more antennas 620a, 620b, 622a, 622b. In some implementations, transceiver electronics 615, 617 include integrated transmitting and receiving circuitry. In some implementations, transceiver electronics 615, 617 include multiple radio units. In some implementations, a radio unit includes a baseband unit (BBU) and a radio frequency unit (RFU) to transmit and receive signals. Transceiver electronics 615, 617 can include one or more of: detector, decoder, modulator, and encoder. Transceiver electronics 615, 617 can include one or more analog circuits. Wireless communication devices 605, 607 include one or more memories 625, 627 configured to store information such as data, instructions, or both. In some implementations, wireless communication devices 605, 607 include dedicated circuitry for transmitting and dedicated circuitry for receiving. In some implementations, a wireless communication device 605, 607 is operable to act as a serving device (e.g., an access point), or a client device.

The various wireless communications functions can be performed by the wireless communication devices 605, 607 using a protocol stack (e.g., the protocol stack described with respect to FIG. 2). Data packets encoded in different protocols for different layers of the protocol stack can be stored in the memory 625, 627. The processor electronics 610, 612 can to execute instructions to pass data packets between layers included in the protocol stack as PDU or SDU. Data packets of an entity can be processed and transmitted by a wireless communication device to a peer entity on the same layer of the other wireless communication device. The radio frequency processing and transmission of the data packets can be performed by the transceiver electronics 615, 617 and the one or more antennas 620, 622, respectively.

While this document contains many specifics, these should not be construed as limitations on the scope of what may be claimed, but rather as descriptions of features specific to particular implementations. Certain features that are described in this document in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

It should be understood that all the processes disclosed in this disclosure may include additional, fewer, or different operations performed in the order shown or in a different order. Moreover, one or more of the individual operations or subsets of the operations in the processes can be performed in isolation or in different contexts to achieve a similar or different result. In some implementations, one or more of the operations in the processes may be iterated, repeated, omitted, modified, or performed by multiple sub-operations. Some or all aspects of the processes may be implemented by data processing apparatus executing computer-readable instructions, which may be included in one or more software programs, modules, or applications configured to provide the functionality described.

Only a few examples and implementations are disclosed. Variations, modifications, and enhancements to the described examples and implementations and other implementations can be made based on what is disclosed.

What is claimed is:

1. A method, comprising:
    receiving a packet data convergence protocol (PDCP) protocol data unit (PDU);
    determining if the received PDCP PDU is a duplicate PDCP PDU or if the received PDCP PDU is outside of a reordering window;
    in response to determining that the received PDCP PDU is a duplicate PDCP PDU or that the received PDCP PDU is outside of the reordering window, determining if header compression is not configured for the received PDCP PDU; and
    in response to determining that header compression is not configured, discarding the received PDCP PDU without performing deciphering and without performing header decompression for the received PDCP PDU.

2. The method of claim 1, wherein the PDCP PDU is received at a PDCP layer from a lower layer.

3. The method of claim 1, further comprising:
    identifying a received PDCP sequence number (SN) of the received PDCP PDU; and
    identifying a Last SN of a last PDCP service data unit (SDU) delivered to an upper layer, the Last SN identifying the SN associated with the last PDCP SDU.

4. The method of claim 3, wherein determining that the received PDCP PDU is a duplicate PDU is based on determining that the received PDCP SN is the same as a stored PDCP SN.

5. The method of claim 3, wherein determining that the received PDCP PDU is outside of the reordering window is based on determining that the received PDCP SN minus the Last SN is greater than a reordering window size or that both the Last SN minus the received PDCP SN is greater than or equal to zero and less than the reordering window.

6. The method of claim 3, wherein the received PDCP SN is identified based on a header of the received PDCP PDU, and the Last SN of the last PDCP SDU delivered is identified based on a header of the last PDCP SDU delivered.

7. The method of claim 3, wherein the last PDCP SDU delivered to the upper layer is an adjacent PDCP PDU received from the lower layer prior to the received PDCP PDU.

8. The method of claim 3, wherein the last PDCP SDU delivered to the upper layer corresponds to a 'Last_Submitted_PDCP_RX_SN' PDCP state variable, and the reordering window size corresponds to a 'Reordering_Window' PDCP constant.

9. The method of claim 8, wherein the 'Last_Submitted_PDCP_RX_SN' is set to 4095 at an establishment of the PDCP entity, and the 'Reordering_Window' is set to 2048.

10. The method of claim 1, wherein the received PDCP PDU is associated with a data radio bearer that maps to a radio link control acknowledge mode.

11. An apparatus, comprising:
an antenna; and
a processor configured to perform operations including:
receiving a packet data convergence protocol (PDCP) protocol data unit (PDU);
determining if the received PDCP PDU is a duplicate PDCP PDU or if the received PDCP PDU is outside of a reordering window; and
in response to determining that the received PDCP PDU is a duplicate PDCP PDU or that the received PDCP PDU is outside of the reordering window, determining if header compression is not configured for the received PDCP PDU; and
in response to determining that header compression is not configured, discarding the received PDCP PDU without performing deciphering and without performing header decompression for the received PDCP PDU.

12. The apparatus of claim 11, wherein the PDCP PDU is received at a PDCP layer from a lower layer.

13. The apparatus of claim 11, the processor further configured to perform operations including:
identifying a received PDCP sequence number (SN) of the received PDCP PDU; and
identifying a Last SN of a last PDCP service data unit (SDU) delivered to an upper layer, the Last SN identifying the SN associated with the last PDCP SDU.

14. The apparatus of claim 13, wherein determining that the received PDCP PDU is a duplicate PDU is based on determining that the received PDCP SN is the same as a stored PDCP SN.

15. The apparatus of claim 13, wherein determining that the received PDCP PDU is outside of the reordering window is based on determining that the received PDCP SN minus the Last SN is greater than a reordering window size or that both the last SN minus the received PDCP SN is greater than or equal to zero and less than the reordering window.

16. The apparatus of claim 13, wherein the received PDCP SN is identified based on a header of the received PDCP PDU, and the Last SN of the last PDCP SDU delivered is identified based on a header of the last PDCP SDU delivered.

17. The apparatus of claim 13, wherein the last PDCP SDU delivered to the upper layer is an adjacent PDCP PDU received from the lower layer prior to the received PDCP PDU.

18. The apparatus of claim 13, wherein the last PDCP SDU delivered to the upper layer corresponds to a 'Last_Submitted_PDCP_RX_SN' PDCP state variable, and the reordering window size corresponds to a 'Reordering_Window' PDCP constant.

19. The apparatus of claim 18, wherein the 'Last_Submitted_PDCP_RX_SN' is set to 4095 at an establishment of the PDCP entity, and the 'Reordering_Window' is set to 2048.

20. The apparatus of claim 11, wherein the received PDCP PDU is associated with a data radio bearer that maps to a radio link control acknowledge mode.

21. A system, comprising:
a first wireless communication device in communication with a second wireless communication device, the first wireless communication device operable to perform operations including:
receiving a packet data convergence protocol (PDCP) protocol data unit (PDU) from the second wireless communication device;
determining if the received PDCP PDU is a duplicate PDCP PDU or if the received PDCP PDU is outside of a reordering window; and
in response to determining that the received PDCP PDU is a duplicate PDCP PDU or that the received PDCP PDU is outside of the reordering window, determining if header compression is not configured for the received PDCP PDU; and
in response to determining that header compression is not configured, discarding the received PDCP PDU without performing deciphering and without performing header decompression for the received PDCP PDU.

22. The system of claim 21, wherein the PDCP PDU is received at a PDCP layer from a lower layer.

23. The system of claim 21, the first wireless communication device further operable to perform operations including:
identifying a received PDCP sequence number (SN) of the received PDCP PDU; and
identifying a Last SN of a last PDCP service data unit (SDU) delivered to an upper layer, the Last SN identifying the SN associated with the last PDCP SDU.

24. The system of claim 23, wherein determining that the received PDCP PDU is a duplicate PDU is based on determining that the received PDCP SN is the same as a stored PDCP SN.

25. The system of claim 23, wherein determining that the received PDCP PDU is outside of the reordering window is based on determining that the received PDCP SN minus the Last SN is greater than a reordering window size or that both the last SN minus the received PDCP SN is greater than or equal to zero and less than the reordering window.

26. The system of claim 23 wherein the received PDCP SN is identified based on a header of the received PDCP PDU, and the Last SN of the last PDCP SDU delivered is identified based on a header of the last PDCP SDU delivered.

27. The system of claim 23, wherein the last PDCP SDU delivered to the upper layer is an adjacent PDCP PDU received from the lower layer prior to the received PDCP PDU.

28. The system of claim 23, wherein the last PDCP SDU delivered to the upper layer corresponds to a 'Last_Submitted_PDCP_RX_SN' PDCP state variable, and the reordering window size corresponds to a 'Reordering_Window' PDCP constant.

29. The system of claim 28, wherein the 'Last_Submitted_PDCP_RX_SN' is set to 4095 at an establishment of the PDCP entity, and the 'Reordering_Window' is set to 2048.

30. The system of claim 21, wherein the received PDCP PDU is associated with a data radio bearer that maps to a radio link control acknowledge mode.

31. The system of claim 21, wherein the first communication device is a user equipment, and the second communication device is a base station.

* * * * *